US007829733B2

(12) United States Patent
Isoda et al.

(10) Patent No.: US 7,829,733 B2
(45) Date of Patent: *Nov. 9, 2010

(54) CHANGE CONTROL RESIN PARTICLES AND TONER FOR DEVELOPING ELECTROSTATIC IMAGES

(75) Inventors: Akihide Isoda, Osaka (JP); Tetsuji Kihara, Osaka (JP); Tohru Tsuruhara, Osaka (JP)

(73) Assignee: Orient Chemical Industries, Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/416,353

(22) Filed: Apr. 1, 2009

(65) Prior Publication Data

US 2009/0233219 A1 Sep. 17, 2009

Related U.S. Application Data

(62) Division of application No. 10/318,119, filed on Dec. 11, 2002, now abandoned.

(30) Foreign Application Priority Data

Dec. 13, 2001 (JP) ............................ 2001-380620
Dec. 13, 2001 (JP) ............................ 2001-380621

(51) Int. Cl.
*C07F 3/06* (2006.01)
*G03G 5/00* (2006.01)

(52) U.S. Cl. ................ 556/132; 430/137.1; 430/137.18

(58) Field of Classification Search ............. 430/137.1, 430/137.18; 556/132
See application file for complete search history.

(56) References Cited

U.S. PATENT DOCUMENTS 7,582,787 B2 * 9/2009 Isoda et al. ................ 556/132

FOREIGN PATENT DOCUMENTS

JP 10-254178 * 9/1998

OTHER PUBLICATIONS

USPTO english-language translation by of JP 10-254178 (Feb. 2005).*
Brownless et al., Inorganica Chimica Acta, vol. 287, pp. 89-94 (1999).*

* cited by examiner

*Primary Examiner*—Porfirio Nazario Gonzalez
(74) *Attorney, Agent, or Firm*—McGlew and Tuttle, P.C.

(57) ABSTRACT

Charge control resin particles comprising a mixture of at least a charge control agent and a resin, wherein a crystalline zinc 3,5-di-tert-butylsalicylate represented by General Formula below, and having major peaks of X-ray diffraction using the CuKα-characteristic X-ray at Bragg angles 2θ of at least 6.4±0.2° and 15.4±0.2°, is contained as said charge control agent. Toner for developing electrostatic images which comprises a coloring agent, a binder resin for toner, and the charge control resin particles.

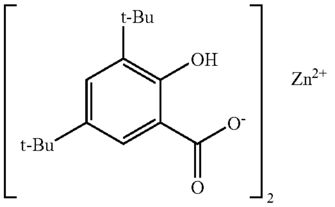

24 Claims, 3 Drawing Sheets

CHANGE CONTROL RESIN PARTICLES AND TONER FOR DEVELOPING ELECTROSTATIC IMAGES

CROSS REFERENCES TO RELATED APPLICATIONS

This application is a divisional under 37 CFR 1.53(b) of prior application Ser. No. 10/318,119 filed Dec. 11, 2002 now abandoned and claims the priority of Japanese Application JP 2001-380621 of Dec. 13, 2001. The entire content of each application is hereby incorporated by reference in its entirety.

BACKGROUND OF THE INVENTION

1. Field of the Invention

The present invention relates to a toner for developing electrostatic images permitting the control of the charge amount of a toner used to develop electrostatic latent images in electrophotography, electrostatic recording, electrostatic printing and others, and charge control resin particles used as a raw material for the production of the same toner.

2. Description of the Prior Art

In copying machines and other equipment based on electrophotography, various dry or wet toners containing a coloring agent, a fixing resin and other substances are used to visualize the electrostatic latent image formed on the photoreceptor having a photosensitive layer containing an inorganic or organic photoconductive substance. The chargeability of such toners is the most important factor in electrostatic latent image developing systems. Thus, to appropriately control the charge amount of toner, a charge control agent providing a positive or negative charge is often added to the toner.

Charge control agents providing a positive charge for toner in actual application include the nigrosine dyes disclosed in Japanese Patent Examined Publication No. SHO41-2427 and elsewhere. Charge control agents providing a negative charge for toner in actual application include the metal complex dyes disclosed in Japanese Patent Examined Publication Nos. SHO41-20153, SHO43-17955, SHO45-26478 and elsewhere. However, most of the charge control agents described above are structurally complex and unstable; for example, they are likely to be decomposed or deteriorated to lose their initial charge control performance when exposed to mechanical friction or impact, temperature or humidity changes, electric impact, light irradiation, etc. Also, many of such conventional charge control agents are colored so that they are unsuitable for use in full-color toners.

As a means for resolving these problems, Japanese Patent Laid-Open No. SHO62-145255, for example, discloses the containment of a metal salt of salicylic acid or a derivative thereof as a charge control agent. Japanese Patent Laid-Open No. SHO63-163374 proposes methods for determining the crystalline structures and crystalline diameters of metal salts of salicylic acid and derivatives thereof to be contained in the toner, with particular mention of zinc 3,5-di-tert-butylsalicylate. Although these substances are advantageous in that they can be used in color toners, their heat stability, uniform dispersibility in resin, or charge control performance, or charging rise speed, in particular, is insufficient so that they remain to be investigated further.

The present invention was developed in view of the aforementioned problems in the prior art and is intended to provide a toner for developing electrostatic images wherein the charge control agent contained therein possesses good heat resistance, good affinity for resin and good dispersibility in resin, which exhibits a high speed of charging rise, which is excellent in charge stability to temperature and humidity changes (environmental resistance) and charge characteristic stability over time (storage stability), and which can be used in various chromatic or achromatic toners, and charge control resin particles used as a starting material for the production of said toner.

SUMMARY OF THE INVENTION

Resolving the above problems, the charge control resin particles of the present invention are charge control resin particles comprising at least a charge control agent and a resin, wherein the charge control agent contained therein is

[A] a crystalline zinc 3,5-di-tert-butylsalicylate represented by General Formula (1) below, and having major peaks of X-ray diffraction using the CuKα-characteristic X-ray (wavelength 1.541 Å) at Bragg angles 2θ of at least 6.4±0.2° and 15.4±0.2° or

[B] a crystalline zinc 3,5-di-tert-butylsalicylate represented by General Formula (1) below, and having major peaks of X-ray diffraction using the CuKα-characteristic X-ray (wavelength 1.541 Å) at Bragg angles 2θ of at least 7.7±0.2° and 15.7±0.2°.

(1)

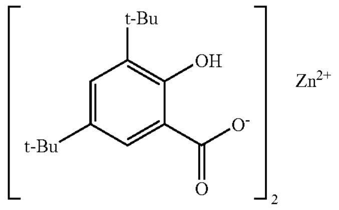

in Formula (1), t-Bu represents a tert-butyl group.

When preparing a toner for developing electrostatic images using the charge control resin particles of the present invention, a coloring agent and a binder resin for toner, the crystalline zinc 3,5-di-tert-butylsalicylate contained in the charge control resin particles is highly uniformly dispersed in the resin so that its charge control performance is improved. In particular, reverse charging in the initial stage of the frictional charging of the toner and charge variation over time can be prevented.

The toner of the present invention for developing electrostatic images, which comprises the charge control resin particles of the present invention, a coloring agent and a binder resin for toner, is a toner wherein the charge control agent contained therein possesses good heat resistance, good affinity for resin and good dispersibility in resin and ensures a high speed of charging rise, it is highly effective in increasing the speed in electrophotographic and other processes and improving the quality of initial images thereof, is excellent in charge stability to temperature and humidity changes (environmental resistance) and charge characteristic stability over time (storage stability), and can be used in various chromatic or achromatic toners.

The aforementioned zinc 3,5-di-tert-butylsalicylate can be prepared by providing zinc to the starting material 3,5-di-tert-butylsalicylic acid obtained by butylation of salicylic acid.

If the 3,5-di-tert-butylsalicylic acid is provided with zinc by a reaction in an aqueous system, the crystalline zinc 3,5-di-tert-butylsalicylate of [A] above can be obtained by steps [1] to [4] below. Although it can also be obtained by a reaction using an organic solvent system, an aqueous reaction is preferred from the viewpoint of cost and safety.

[1] Step for dissolving 3,5-di-tert-butylsalicylic acid in an alkaline aqueous solution.

[2] Step for dissolving a zinc provider in water.

[3] Reaction step wherein the aqueous solution of a zinc provider obtained in step [2] is added to the aqueous solution of 3,5-di-tert-butylsalicylic acid obtained in step [1], while heating the latter, and the mixture is stirred with heating until the reaction is completed.

[4] Post-treatment step for filtering the reaction mixture obtained in step [3] and washing, drying and then milling the cake filtered off.

Specifically, the desired product can, for example, be synthesized by the following method. A sufficient amount of an alkaline aqueous solution is added to 2 mol of 3,5-di-tert-butylsalicylic acid and dissolved with heating. Separately, an aqueous solution incorporating 1 mol of a zinc provider is prepared. This solution is added drop by drop to the aforementioned aqueous solution of 3,5-di-tert-butylsalicylic acid, while heating the latter aqueous solution, to cause the reaction with heating and pH adjustment; after completion of the reaction, the reaction mixture is filtered and the cake filtered off is washed with water and dried.

Examples of zinc providers used to provide zinc to 3,5-di-tert-butylsalicylic acid include, but are not limited to, zinc sulfate, zinc chloride and zinc acetate and so on.

As preferable examples of the crystalline zinc 3,5-di-tert-butylsalicylate of [A] above which can be obtained by these steps, there may be mentioned a crystalline zinc 3,5-di-tert-butylsalicylate having major peaks of X-ray diffraction using the CuKα-characteristic X-ray at Bragg angles 2θ of at least 5.7±0.2°, 6.4±0.2° and 15.4±0.2°; and a crystalline zinc 3,5-di-tert-butylsalicylate having major peaks of X-ray diffraction using the CuKα-characteristic X-ray at Bragg angles 2θ of at least 5.2±0.2°, 5.7±0.2, 6.4±0.2°, 6.7±0.2° and 15.4±0.2°.

If the zinc 3,5-di-tert-butylsalicylate is zincified by a reaction in an aqueous system, the crystalline zinc 3,5-di-tert-butylsalicylate of [B] above can be obtained by steps [1], [2], [3]' and [4] wherein step [3] above is replaced with reaction step [3]' wherein the aqueous solution of 3,5-di-tert-butylsalicylic acid obtained in step [1] is added to the aqueous solution of a zinc provider obtained in step [2], while heating the latter, and the mixture is stirred with heating until the reaction is completed.

Specifically, the desired product can, for example, be synthesized by the following method. A sufficient amount of an alkaline aqueous solution is added to 2 mol of 3,5-di-tert-butylsalicylic acid and dissolved with heating. Separately, an aqueous solution incorporating 1 mol of a zinc provider is prepared. While heating this aqueous solution, the aforementioned aqueous solution of 3,5-di-tert-butylsalicylic acid is added drop by drop, and the reaction is carried out with heating and pH adjustment; after completion of the reaction, the reaction mixture is filtered and the cake filtered off is washed with water and dried. As example zinc providers, there may be mentioned those mentioned above.

As a preferable example of the crystalline zinc 3,5-di-tert-butylsalicylate of [B] above, which can be obtained by these steps, there may be mentioned a crystalline zinc 3,5-di-tert-butylsalicylate having major peaks of X-ray diffraction using the CuKα-characteristic X-ray at Bragg angles 2θ of 5.2±0.2°, 6.7±0.2°, 7.7±0.2° and 15.7±0.2°.

The crystalline zinc 3,5-di-tert-butylsalicylate of [B] (especially that obtained by steps [1], [2], [3]' and [4]) can be obtained as a charge control agent having a great amount of initial charges, a good charge control characteristic, and an appropriately low bulk density of the zinc 3,5-di-tert-butylsalicylate particles (e.g., 2 to 5 ml/g). For this reason, it improves the dispersibility in resins such as resins for toner, making it easy to uniformly disperse in the resin, increasing the toner charging rise speed, and improving charge stability to temperature and humidity changes (environmental resistance) and charge characteristic stability over time (storage stability), and it can be transported with an increased mass per unit volume so that the transportation cost can be reduced significantly.

The charge control agent in the present invention may consist essentially of the aforementioned crystalline zinc 3,5-di-tert-butylsalicylate.

The aforementioned charge control resin particles may be solidified milled particles of a thermally kneaded product of the mixture of at least a charge control agent and a resin. Such charge control resin particles can, for example, be obtained by mixing a charge control agent and a resin (e.g., binder resin) at a given ratio, heating and kneading the mixture, and cooling, solidifying and milling the resin composition thus obtained.

The mixing ratio by weight of the charge control agent (e.g., crystalline zinc 3,5-di-tert-butylsalicylate of [A] or [B] above) and the resin (e.g., binder resin) in the charge control resin particles of the present invention may preferably be 1:9 to 9:1, more preferably 3:7 to 7:3.

The toner of the present invention for developing electrostatic images is a toner for developing electrostatic images comprising the aforementioned charge control resin particles, a coloring agent and a binder resin for toner, or a toner for developing electrostatic images comprising a charge control agent, a coloring agent and a binder resin for toner, wherein a crystalline zinc 3,5-di-tert-butylsalicylate represented by General Formula (1) above, and having major peaks of X-ray diffraction using the CuKα-characteristic X-ray at Bragg angles 2θ of at least 5.2±0.2°, 6.7±0.2°, 7.7±0.2° and 15.7±0.2°, is contained as the charge control agent.

DETAILED DESCRIPTION OF THE INVENTION

Charge Control Resin Particles

Figure 1:
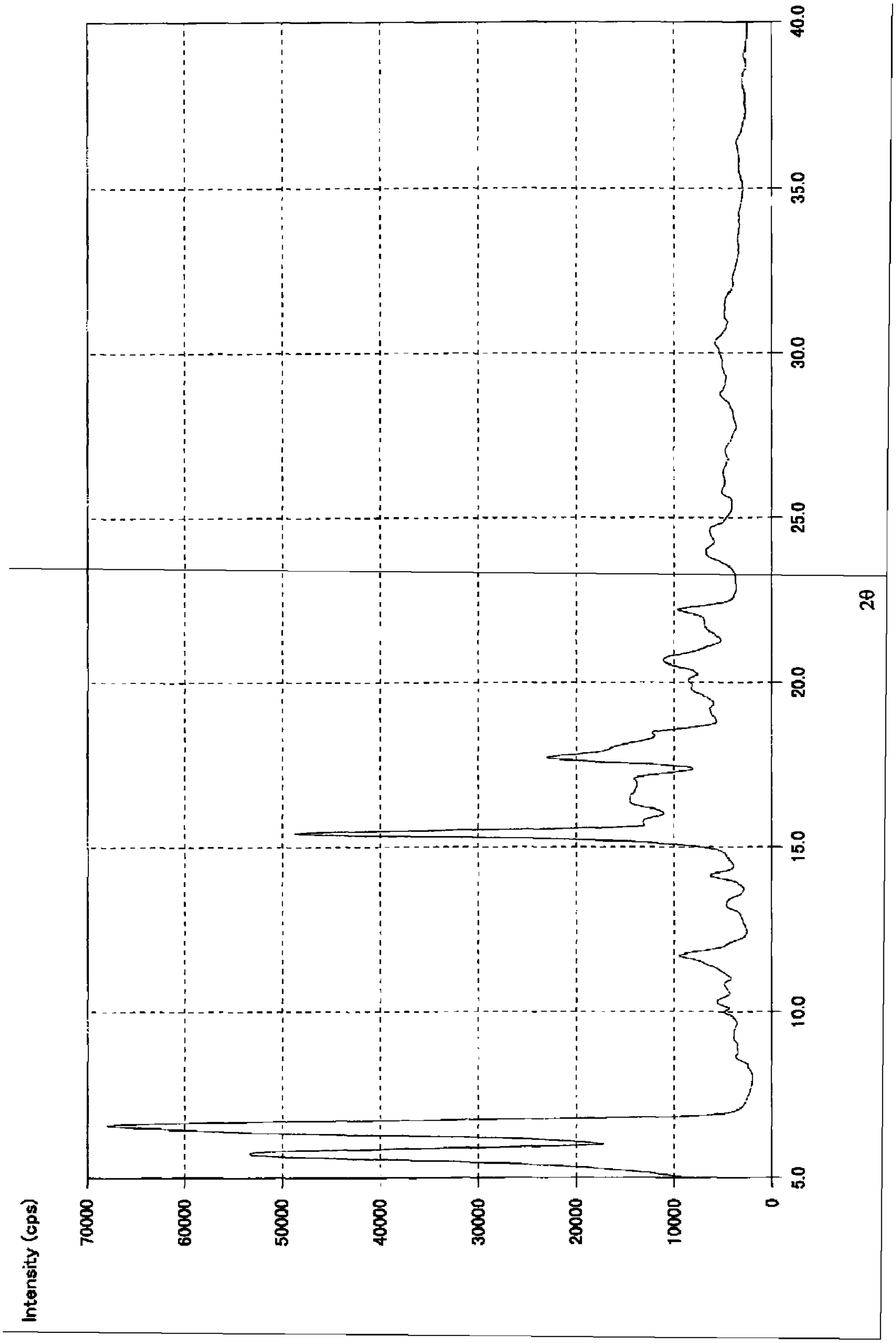
FIG. 1 shows an X-ray diffraction chart of the charge control agent of Example 1.

Although the particle diameter of the crystalline zinc 3,5-di-tert-butylsalicylate in the present invention is not subject to limitation, it is desirable that the average particle diameter be not more than 20 μm, preferably not more than 10 μm, from the viewpoint of the improvement of its dispersibility in resin.

Desired crystalline transformation for the zinc 3,5-di-tert-butylsalicylate in the present invention can, for example, be achieved by wet and/or dry dispersion milling or solvent treatment.

The crystalline zinc 3,5-di-tert-butylsalicylate (charge control agent) in the present invention surpasses conventional salicylic acid metal salts in dispersibility in resin. When preparing the charge control resin particles of the present invention by mixing this crystalline zinc 3,5-di-tert-butylsalicylate and a resin, and preparing a toner for developing electrostatic images by mixing the charge control resin particles, a coloring agent and a binder resin for toner, the aforementioned crystalline zinc 3,5-di-tert-butylsalicylate in the present invention is more uniformly dispersed in the resin so that its charge control performance is improved. In particular, reverse charging in the initial stage of the frictional charging of the toner and charge variation over time can be prevented.

Examples of resins which can be used in the charge control resin particles of the present invention include the commonly known binder resins for toner described below. A resin preferably used in charge control resin particles is a resin having a number-average molecular weight (Mn) of 2500 to 30000, preferably a resin having a weight-average molecular weight (Mw)/number-average molecular weight (Mn) ratio in the range from 2 to 20. The resin in charge control resin particles and the resin used to prepare a toner using the same charge control resin particles may be identical or not.

The charge control resin particles of the present invention are, for example, produced as described below. Specifically, charge control resin particles can be obtained by thoroughly mixing at least a charge control agent and a resin in a Henschel mixer or another mechanical mixer, and subsequently kneading the mixture in a molten state under normal or increased pressure in a hot kneader such as a heat roll, a kneader or an extruder, cooling, solidifying and then milling the mixture.

The charge control agent used in the production of the charge control resin particles of the present invention may, for example, be in the form of a dry powder or a pre-drying aqueous pressed cake. When using a charge control agent in a dry powder form, a dispersion aid or an additive may be added to improve its dispersibility in resin. For example, water or any organic solvent may be used. Specifically, after the charge control agent of the present invention, a resin and water or any organic solvent are mixed in a Henschel mixer or another mechanical mixer, the mixture is charged and kneaded in a heat roll, a flasher, a kneader, an extruder, or the like. Alternatively, when using a flasher, a kneader, or the like, it is possible to charge and mix the charge control agent, resin and water or any organic solvent in a single step at one time. Subsequently, the mixture is kneaded in a molten state with heating under increased or normal pressure. The remaining water or solvent is then evaporated off under normal or reduced pressure to dry the mixture. The mixture is cooled, solidified and then milled to yield charge control resin particles. Although the aforementioned organic solvent may be a commonly known organic solvent, it is preferable to use a low-boiling highly volatile solvent such as ethanol, methanol, isopropanol or acetone.

Toner for Developing Electrostatic Images

The toner of the present invention for developing electrostatic images comprises a charge control agent [a crystalline zinc 3,5-di-tert-butylsalicylate represented by General Formula (1) above, and having major peaks of X-ray diffraction using the CuKα-characteristic X-ray at Bragg angles 2θ of at least 5.2±0.2°, 6.7±0.2°, 7.7±0.2° and 15.7±0.2°] or the charge control resin particles of the present invention, a binder resin for toner and a coloring agent.

The amount of charge control agent incorporated in the toner of the present invention for developing electrostatic images may be 0.1 to 10 parts by weight, preferably 0.5 to 5 parts by weight per 100 parts by weight of the binder resin for toner (or the sum of the binder resin for toner and the resin in the charge control resin particles).

Examples of resins which can be used in the toner of the present invention include resins that have traditionally been used as binder resins for toners. Specifically, there may be mentioned synthetic resins such as polystyrene resin, styrene-acrylic resin, styrene-butadiene resin, styrene-maleic resin, styrene-vinyl methyl ether resin, styrene-methacrylate copolymer, polyester resin, phenol resin and epoxy resin. These resins may be used singly or in blends of several kinds. Of these resins, those having a glass transition point of 50 to 75° C., a softening point of 80 to 150° C. and a number-average molecular weight of 1000 to 30000 are preferred, with greater preference given to those wherein the weight-average molecular weight/number-average molecular weight ratio is 2 to 50.

For preferable use of a binder resin for toner and a resin in charge control resin particles in a toner used for full-color imaging by subtractive color mixture or for OHP (overhead projectors) etc., the resin or binder resin is required to have special properties, for example, it should be transparent, substantially colorless (no tone damage occurs in the toner image), compatible with the charge control agent used, fluid under appropriate heat or pressure, and pulverizable. Examples of such resins for preferable use include polystyrene resin, acrylic resin, styrene-acrylic resin, styrene-methacrylate copolymer and polyester resin. A polyester resin or styrene-acrylic resin having an acid value of 1 to 50 mg KOH/g, in particular, is preferred.

The toner of the present invention may incorporate various known dyes and pigments as coloring agents. Examples of such dyes or pigments which can be used in color toners include carbon black, organic pigments such as quinophthalone, Hansa Yellow, Rhodamine 6G Lake, quinacridone, Rose Bengale, copper Phthalocyanine Blue and copper Phthalocyanine Green, various oil-soluble dyes or disperse dyes such as azo dyes, quinophthalone dyes, anthraquinone dyes, xanthene dyes, triphenylmethane dyes and phthalocyanine dyes, and dyes and pigments modified with higher fatty acids, synthetic resins, or the like.

The toner of the present invention for developing electrostatic images may incorporate the aforementioned coloring agents singly or in combination. Dyes and pigments having good spectral characteristics can be preferably used to prepare toners of the three primaries for full-color imaging. Chromatic monocolor toners may incorporate an appropriate combination of a pigment and dye of the same color tone, such as a rhodamine pigment and dye, a quinophthalone pigment and dye, or a phthalocyanine pigment and dye, as coloring agents.

Also, to improve toner quality, additives, e.g., anti-offset agents, fluidity-improving agents (e.g., various metal oxides such as silica, aluminum oxide and titanium oxides, magnesium fluoride, etc.) and cleaning aids (e.g., metal soaps of stearic acid etc.; various synthetic resin microparticles such as fluorine-series synthetic resin microparticles, silicone-series synthetic resin microparticles and styrene-(meth)acrylic synthetic resin microparticles), can be added internally or externally.

Anti-offset agents (releasing agents) used to improve toner fixability as described above include various waxes, particularly those having average molecular weights of 500 to 15000. Specifically, there can be used polyolefin type waxes such as low molecular polypropylene, polyethylene, oxidized polypropylene and oxidized polyethylene; and natural waxes such as carnauba wax, rice wax and montan wax.

The toner of the present invention for developing electrostatic images is, for example, produced as described below. A toner having an average particle size of 5 to 20 μm is obtained by thoroughly mixing a binder resin for toner and coloring agent a charge control agent or charge control resin particles as described above, and, if necessary, a magnetic material, a fluidizing agent and other additives, using a ball mill or another mechanical mixer, subsequently kneading the mixture in a molten state using a hot kneader such as a heat roll, a kneader or an extruder, cooling, solidifying and then pulverizing the mixture, and classifying the particles.

Other usable methods include the method in which the starting materials are dispersed in a binder resin solution and then spray dried, and the polymerizing toner production method in which a given set of starting materials are mixed in a monomer for binder resin to yield an emulsified suspension which is then polymerized to yield the desired toner (e.g., the method described in Japanese Patent Laid-Open No. HEI1-260461 and Japanese Patent Laid-Open No. HEI2-32365). When using the toner of the present invention as a two-component developer, development can be achieved by the two-component magnetic brush developing process or another process using the toner in mixture with a carrier powder.

Any known carrier can be used. Examples of the carrier include iron powder, nickel powder, ferrite powder and glass beads about 50 to 200 μm in particle diameter, and such materials as coated with acrylate copolymer, styrene-acrylate copolymer, silicone resin, polyamide resin, ethylene fluoride resin or the like.

When using the toner of the present invention as a one-component developer, a fine powder of a ferromagnetic material such as iron powder, nickel powder or ferrite powder may be added and dispersed in preparing the toner as described above. Examples of developing processes which can be used in this case include contact development and jumping development.

EXAMPLES

The present invention is hereinafter described in more detail by means of the following examples, but these are not to be construed as limitative on the present invention. In the description below, "part(s) by weight" are referred to as "part(s)" for short.

Examples 1 through 5 pertain to the production of charge control resin particles.

Example 1

Polyester resin [Diacron ER561 (trade name), produced by Mitsubishi Chemical Corporation] . . . 50 parts Charge control agent (crystalline zinc 3,5-di-tert-butylsalicylate having major peaks of X-ray diffraction using the CuKα-characteristic X-ray [wavelength 1.541 Å] at Bragg angles 2θ of 5.7±0.2°, 6.4±0.2° and 15.4±0.2°; an X-ray diffraction chart shown in FIG. 1) . . . 50 parts Methanol . . . 10 parts The above ingredients were charged in a kneader and mixed for 15 minutes to moisten the polyester resin powder and charge control agent with the methanol, after which this mixture was kneaded in a molten state while the methanol was evaporated by gradual heating. After cooling, this mixture was further kneaded with a pair of heat rolls and cooled, and then roughly crushed in a vibration mill to yield charge control resin particles 1.

Production of the Aforementioned Charge Control Agent 25.0 g of 3,5-di-tert-butylsalicylic acid (0.10 mol obtained by butylation of salicylic acid) was dissolved in 200 ml of a 2% aqueous solution of NaOH and heated to about 70° C. Separately, 14.4 g (0.05 mol) of zinc sulfate heptahydrate was dissolved in 200 ml of water. This aqueous solution of zinc sulfate was added drop by drop to the aforementioned aqueous solution of 3,5-di-tert-butylsalicylic acid over a period of about 30 minutes. Subsequently, after the reaction was carried out at 70 to 80° C. for 2 hours, the reaction mixture was adjusted to a pH of 7.0±0.5 to complete the reaction.

This reaction solution was filtered while it remained hot, and the cake filtered off was washed with water and dried to yield 27.3 g of a white fine powder. The bulk density of this white powder was 6.9 ml/g. Analysis of the thus-obtained white powder using a powder X-ray diffraction apparatus detected major peaks of X-ray diffraction using the CuKα-characteristic X-ray [wavelength 1.541 Å] at Bragg angles 2θ of 5.7±0.2°, 6.4±0.2° and 15.4±0.2°.

In the present and following Examples, X-ray diffraction analysis of crystalline zinc 3,5-di-tert-butylsalicylate was conducted using the apparatus shown below on the undermentioned condition.

Instrumentation: MXP-18 X-ray diffraction apparatus (manufactured by MAC SCIENCE K.K.)

Target: Cu

Wavelength: 1.5405 Å (CuKα1)

Voltage and current: 40.0 kV, 200 mA

Divergence slit: 1.0°

Receiving slit: 0.30 mm

Scattering slit: 1.0°

Scanning speed: 4.0 deg/min

Example 2

Figure 2:
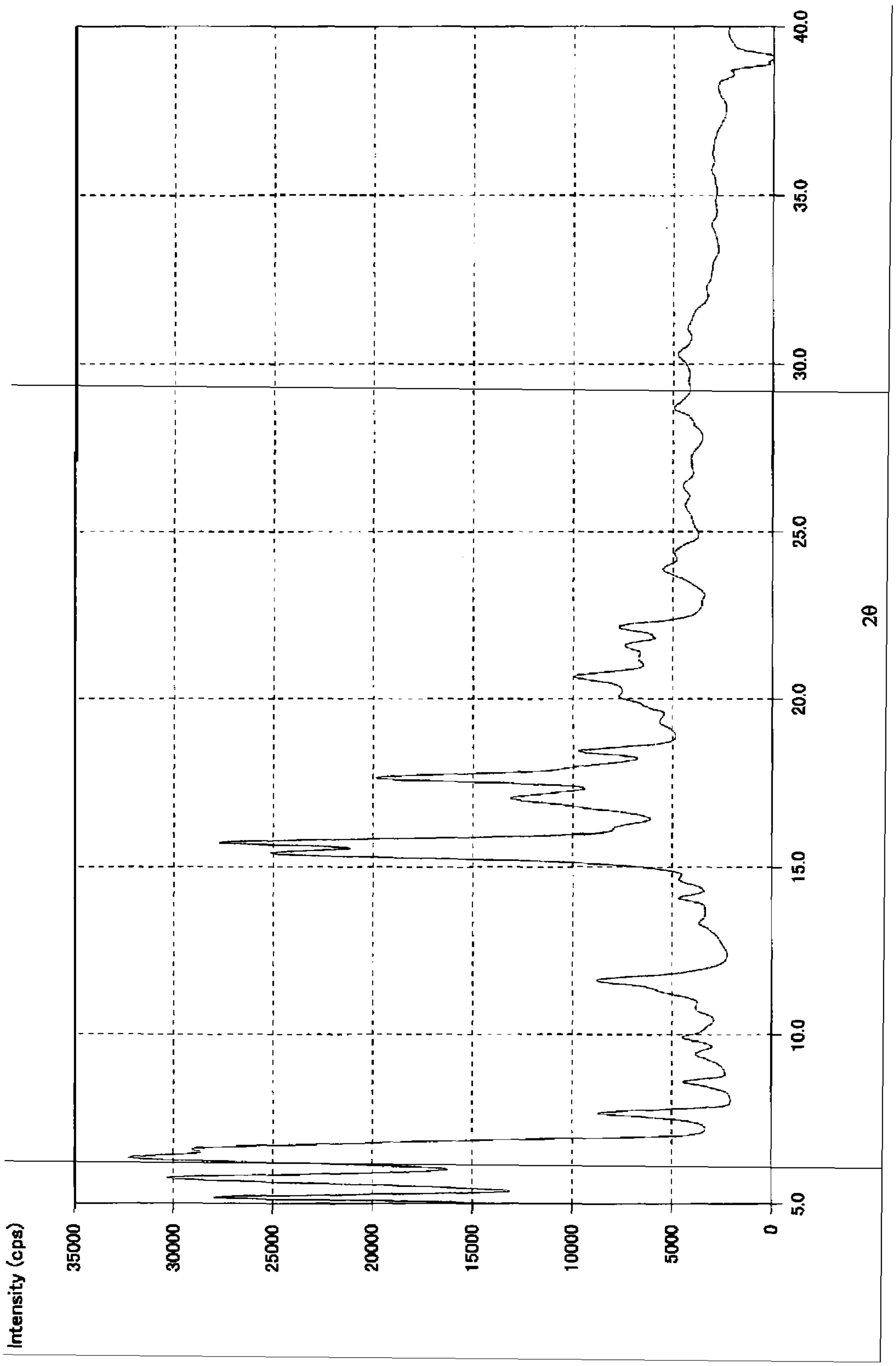
FIG. 2 shows an X-ray diffraction chart of the charge control agent of Example 2.

Charge control resin particles 2 were prepared in the same manner as Example 1, except that the zinc 3,5-di-tert-butylsalicylate of Example 1 was replaced with a crystalline zinc 3,5-di-tert-butylsalicylate having major peaks of X-ray diffraction using the CuKα-characteristic X-ray [wavelength 1.541 Å] at Bragg angles 2θ of at least 5.2±0.2°, 5.7±0.2°, 6.4±0.2°, 6.7±0.2° and 15.4±0.2° (X-ray diffraction chart shown in FIG. 2).

Example 3

Figure 3:
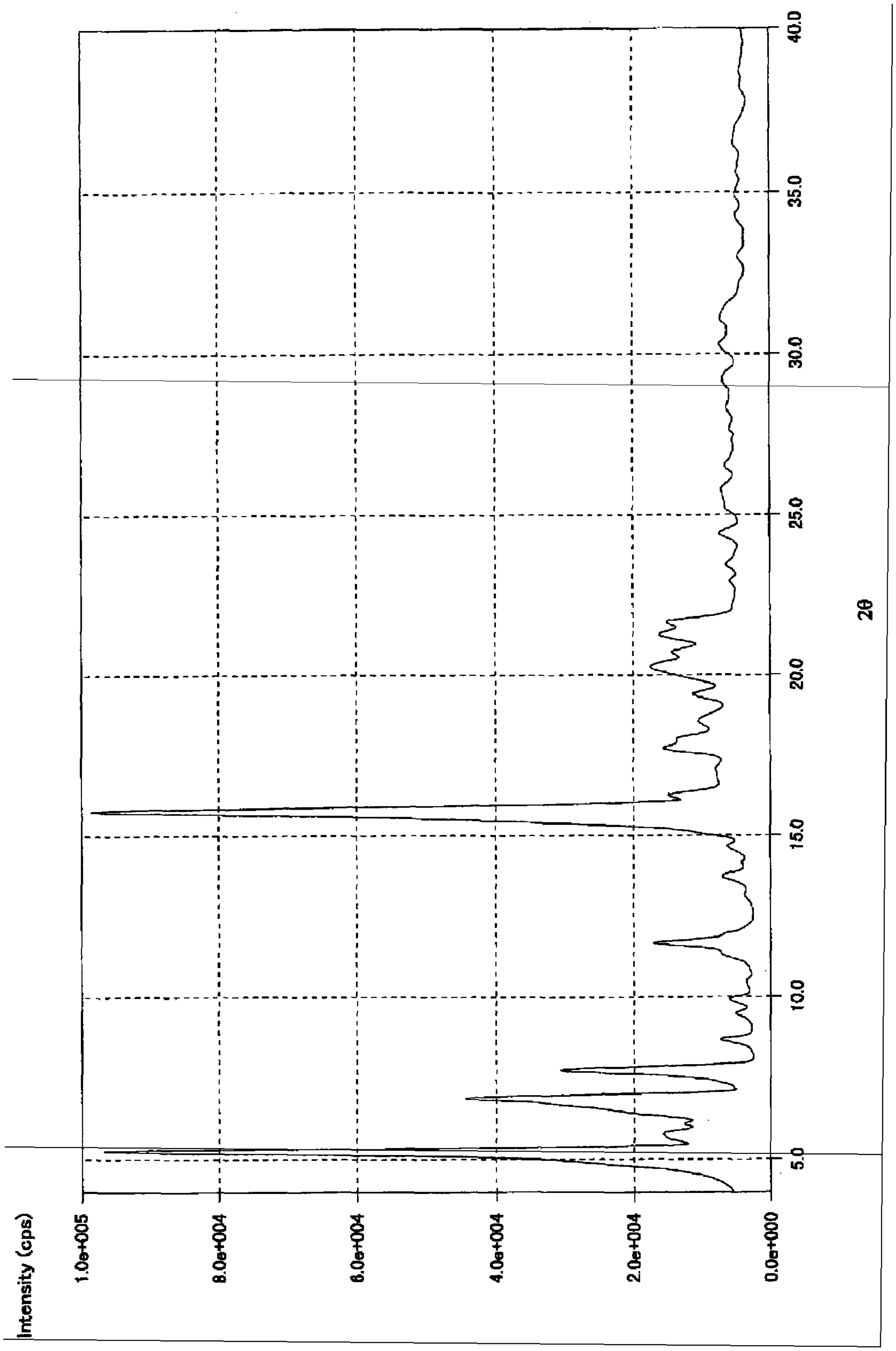
FIG. 3 shows an X-ray diffraction chart of the charge control agent of Example 3.

Charge control resin particles 3 were prepared in the same manner as Example 1, except that the zinc 3,5-di-tert-butylsalicylate of Example 1 was replaced with a crystalline zinc 3,5-di-tert-butylsalicylate having major peaks of X-ray diffraction using the CuKα-characteristic X-ray [wavelength 1.541 Å] at Bragg angles 2θ of at least 5.2±0.2°, 6.7±0.2°, 7.7±0.2° and 15.7±0.2° (X-ray diffraction chart shown in FIG. 3).

Production of the Aforementioned Charge Control Agent 14.4 g (0.05 mol) of zinc sulfate heptahydrate was dissolved in 200 ml of water. Separately, 25.0 g of 3,5-di-tert-butylsalicylic acid (0.10 mol obtained by butylation of salicylic acid) was dissolved in 200 ml of a 2% aqueous solution of NaOH and heated to about 70° C. This aqueous solution of 3,5-di-tert-butylsalicylic acid was added drop by drop to the aforementioned aqueous solution of zinc sulfate over a period of about 30 minutes. Subsequently, after the reaction was carried out at 70 to 80° C. for 2 hours, the reaction mixture was adjusted to a pH of 7.0±0.5 to complete the reaction.

This reaction solution was filtered while it remained hot, and the cake filtered off was washed with water and dried to yield 27.5 g of a white fine powder. The bulk density of this white powder was 3.0 ml/g. Analysis of the thus-obtained white powder using a powder X-ray diffraction apparatus detected major peaks of X-ray diffraction using the CuKα-characteristic X-ray [wavelength 1.541 Å] at Bragg angles 2θ of 5.2±0.2°, 6.7±0.2°, 7.7±0.2° and 15.7±0.2°.

Example 4

Styrene-acrylic copolymer resin [ALMATEX CPR600B (trade name), produced by Mitsui Chemicals, Inc.] . . . 70 parts Charge control agent (crystalline zinc 3,5-di-tert-butylsalicylate having major peaks of X-ray diffraction using the CuKα-characteristic X-ray [wavelength 1.541 Å] at Bragg angles 2θ of 5.7±0.2°, 6.4±0.2° and 15.4±0.2°) . . . 30 parts The above ingredients were uniformly pre-mixed in a Henschel mixer, after which this mixture was kneaded in a molten state using a kneader. After cooling, this mixture was further kneaded with a pair of heat rolls and cooled, and then roughly crushed in a vibration mill to yield charge control resin particles 4.

Example 5

Charge control resin particles 5 were prepared in the same manner as Example 4, except that the zinc 3,5-di-tert-butylsalicylate of Example 4 was replaced with a crystalline zinc 3,5-di-tert-butylsalicylate having major peaks of X-ray diffraction using the CuKα-characteristic X-ray [wavelength 1.541 Å] at Bragg angles 2θ of at least 5.2±0.2°, 6.7±0.2°, 7.7±0.2° and 15.7±0.2°.

Examples 6 through 10 and Comparative Example 1 pertain to toner for developing electrostatic images.

Example 6

Polyester resin [Diacron ER561 (trade name), produced by Mitsubishi Chemical Corporation] . . . 100 parts Carbon black [MA-100 (trade name), produced by Mitsubishi Chemical Corporation] . . . 6 parts Low polymer polypropylene [Viscol 550-P (trade name), produced by Sanyo Chemical Industries, Ltd.] . . . 5 parts Charge control resin particles 1 obtained in Example 1 . . . 2 parts The above ingredients were uniformly pre-mixed using a high-speed mixer. This premix was then kneaded in a molten state using an extruder, cooled and thereafter roughly milled using a vibration mill. The rough milling product obtained was finely pulverized using an air jet mill equipped with a classifier to yield a negatively chargeable black toner 10 to 20 μm in particle diameter. Five parts of this toner was admixed with 95 parts of an iron powder carrier [TEFV 200/300 (trade name), produced by Powdertech Co., Ltd.) to yield a developer.

This developer was measured in a polyethylene bottle. This bottle was rotated under standard conditions (20°-60% RH) in a ball mill at a rotation rate of 100 rpm to stir and charge the developer, and changes over time in the charge amount of the developer were determined. The results of the determination of changes over time in the charge amount are shown in Table 1.

Separately, this developer was measured in a polyethylene bottle. This bottle was rotated in each of a low-temperature low-humidity (5° C.-30% RH) atmosphere and a high-temperature high-humidity (35° C.-90% RH) atmosphere in a ball mill at a rotation rate of 100 rpm for 10 minutes to stir and charge the developer, and changes over time in the charge amount of the developer in each case were determined. The results of the determination of the environmental stability of the charge amount are shown in Table 2.

Changes Over Time in Charge Amount

TABLE 1

| | Time (min) | | | | | |
|---|---|---|---|---|---|---|
| | 1 | 3 | 5 | 10 | 15 | 30 |
| Charge amount (−μC/g) | 30.0 | 31.9 | 33.5 | 36.0 | 38.0 | 38.5 |

Environmental Stability

TABLE 2

| | 5° C.-30% RH | 35° C.-90% RH |
|---|---|---|
| Charge amount (−μC/g) | 38.2 | 38.0 |

When this developer was used to form toner images using a commercial copying machine (selenium drum type), fogging-free high-quality images with good thin line reproducibility and good charge stability and sustainability without image density reduction were obtained. The offset phenomenon was never observed.

Example 7

Styrene-acrylic copolymer resin [ALMATEX CPR600B (trade name), produced by Mitsui Chemicals, Inc.] . . . 100 parts Carbon black [MA-100 (trade name), produced by Mitsubishi Chemical Corporation] . . . 6 parts Low polymer polypropylene [Viscol 550-P (trade name), produced by Sanyo Chemical Industries, Ltd.] . . . 5 parts Charge control resin particles 1 obtained in Example 1 . . . 2 parts The above ingredients were treated in the same manner as Example 6 to yield a negatively chargeable black toner 10 to 20 μm in particle diameter and a developer. Using this developer, changes over time in charge amount and the environmental stability of charge amount were determined in the same manner as Example 6. The results are shown in Tables 3 and 4, respectively.

Changes Over Time in Charge Amount

TABLE 3

| | Time (min) | | | | | |
|---|---|---|---|---|---|---|
| | 1 | 3 | 5 | 10 | 15 | 30 |
| Charge amount (−μC/g) | 21.5 | 23.3 | 24.1 | 24.7 | 25.0 | 26.5 |

Environmental Stability

TABLE 4

| | 5° C.-30% RH | 35° C.-90% RH |
|---|---|---|
| Charge amount (−μC/g) | 26.5 | 25.6 |

When this developer was used to form toner images using a commercial copying machine (selenium drum type), fogging-free high-quality images with good thin line reproducibility and good charge stability and sustainability without image density reduction were obtained. The offset phenomenon was never observed.

Example 8

Polyester resin [Diacron ER561 (trade name), produced by Mitsubishi Chemical Corporation] . . . 100 parts Carbon black [MA-100 (trade name), produced by Mitsubishi Chemical Corporation] . . . 6 parts Low polymer polypropylene [Viscol 550-P (trade name), produced by Sanyo Chemical Industries, Ltd.] . . . 5 parts Charge control resin particles 2 obtained in Example 2 . . . 2 parts The above ingredients were treated in the same manner as Example 6 to yield a negatively chargeable black toner 10 to 20 μm in particle diameter and a developer. Using this developer, changes over time in charge amount and the environmental stability of charge amount were determined in the same manner as Example 6. The results are shown in Tables 5 and 6, respectively.

Changes Over Time in Charge Amount

TABLE 5

| | Time (min) | | | | | |
|---|---|---|---|---|---|---|
| | 1 | 3 | 5 | 10 | 15 | 30 |
| Charge amount (−μC/g) | 33.2 | 34.5 | 35.6 | 36.9 | 37.5 | 38.0 |

Environmental Stability

TABLE 6

| | 5° C.-30% RH | 35° C.-90% RH |
|---|---|---|
| Charge amount (−μC/g) | 37.7 | 37.0 |

When this developer was used to form toner images using a commercial copying machine (selenium drum type), fogging-free high-quality images with good thin line reproducibility and good charge stability and sustainability without image density reduction were obtained. The offset phenomenon was never observed.

Example 9

Polyester resin [Diacron ER561 (trade name), produced by Mitsubishi Chemical Corporation] . . . 100 parts Oil-soluble magenta dye [Oil Pink #312(trade name), produced by Orient Chemical Industries, Ltd.] . . . 6 parts Low polymer polypropylene [Viscol 550-P (trade name), produced by Sanyo Chemical Industries, Ltd.] . . . 5 parts Charge control resin particles 3 obtained in Example 3 . . . 2 parts The above ingredients were treated in the same manner as Example 6 to yield a negatively chargeable magenta toner 10 to 20 μm in particle diameter and a developer. Using this developer, changes over time in charge amount and the environmental stability of charge amount were determined in the same manner as Example 6. The results are shown in Tables 7 and 8, respectively.

Changes Over Time in Charge Amount

TABLE 7

| | Time (min) | | | | | |
|---|---|---|---|---|---|---|
| | 1 | 3 | 5 | 10 | 15 | 30 |
| Charge amount (−μC/g) | 37.0 | 38.5 | 39.0 | 39.4 | 39.7 | 40.3 |

Environmental Stability

TABLE 8

| | 5° C.-30% RH | 35° C.-90% RH |
|---|---|---|
| Charge amount (−μC/g) | 40.2 | 39.8 |

When this developer was used to form toner images using a commercial copying machine (selenium drum type), fogging-free vivid magenta images with good thin line reproducibility, excellent spectral characteristics, and transparency suitable for color blending by superposing were obtained.

Example 10

Styrene-acrylic copolymer resin [ALMATEX CPR600B (trade name), produced by Mitsui Chemicals, Inc.] . . . 100 parts Carbon black [MA-100 (trade name), produced by Mitsubishi Chemical Corporation] . . . 6 parts Low polymer polypropylene [Viscol 550-P (trade name), produced by Sanyo Chemical Industries, Ltd.] . . . 5 parts Charge control agent (crystalline zinc 3,5-di-tert-butylsalicylate having major peaks of X-ray diffraction using the CuKα-characteristic X-ray [wavelength 1.541 Å] at Bragg angles 2θ of at least 5.2±0.2°, 6.7±0.2°, 7.7±0.2° and 15.7±0.2°) . . . 1 part The above ingredients were treated in the same manner as Example 6 to yield a negatively chargeable black toner 10 to 20 μm in particle diameter and a developer. Using this developer, changes over time in charge amount and the environmental stability of charge amount were determined in the same manner as Example 6. The results are shown in Tables 9 and 10, respectively.

Changes Over Time in Charge Amount

TABLE 9

| | Time (min) | | | | | |
|---|---|---|---|---|---|---|
| | 1 | 3 | 5 | 10 | 15 | 30 |
| Charge amount (−μC/g) | 23.1 | 25.2 | 26.6 | 27.0 | 27.2 | 27.6 |

Environmental Stability

TABLE 10

| | 5° C.-30% RH | 35° C.-90% RH |
|---|---|---|
| Charge amount (−μC/g) | 27.3 | 26.8 |

When this developer was used to form toner images using a commercial copying machine (selenium drum type), fogging-free high-quality images with good thin line reproducibility and good charge stability and sustainability without image density reduction were obtained. The offset phenomenon was never observed.

Comparative Example 1

A negatively chargeable black toner 10 to 20 μm in particle diameter and a developer were prepared in the same manner as Example 6, except that an aluminum compound of 3,5-di-tert-butylsalicylic acid (charge control agent) was used in place of the charge control resin particles. Using this developer, changes over time in charge amount and the environmental stability of charge amount were determined in the same manner as Example 6. The results are shown in Tables 11 and 12, respectively.

Changes Over Time in Charge Amount

TABLE 11

| | Time (min) | | | | | |
|---|---|---|---|---|---|---|
| | 1 | 3 | 5 | 10 | 15 | 30 |
| Charge amount (−μC/g) | 22.5 | 26.8 | 29.4 | 32.3 | 33.2 | 35.5 |

Environmental Stability

TABLE 12

| | 5° C.-30% RH | 35° C.-90% RH |
|---|---|---|
| Charge amount (−μC/g) | 34.1 | 29.8 |

What is claimed is:

1. Process for manufacturing charge control agent whose active ingredient is a crystalline zinc 3,5-di-tert-butylsalicylate represented by General Formula (1) below, and having major peaks of X-ray diffraction using the CuK α-characteristic X-ray at Bragg angles 2θ of at least 5.2±0.2°, 6.7±0.2°, 7.7±0.2° and 15.7±0.2° comprising:

[a] step for dissolving a 3,5-di-tert-butylsalicylic acid, which is obtained by butylation of salicylic acid, in an alkaline aqueous solution;

[b] step for dissolving a zinc provider in water;

[c] reaction step wherein the aqueous solution of 3,5-di-tert-butylsalicylic acid obtained in step [a] is added to the aqueous solution of a zinc provider obtained in step [b] while heating the aqueous solution of a zinc provider, and the mixture is stirred with heating until the reaction is completed:

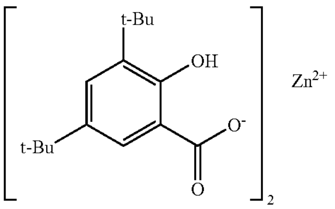
(1)

in which t-Bu represents a tert-butyl group.

2. Process of claim 1, further comprising a step of:

[d] post-treatment step for filtering the reaction mixture obtained in step [c] and washing, drying and then milling the cake filtered off.

3. Process of claim 1, wherein said zinc provider is a zinc sulfate, a zinc chloride or a zinc acetate.

4. Process of claim 2, wherein said zinc provider is a zinc sulfate, a zinc chloride or a zinc acetate.

5. Process of claim 1, wherein said step [c] is a reaction step wherein the aqueous solution of 3,5-di-tert-butylsalicylic acid obtained in step [a] is added to the aqueous solution of a zinc provider obtained in step [b] while heating the aqueous solution of a zinc provider to cause a reaction between the zinc provider and the 3,5-di-tert-butylsalicylic acid, and the mixture is stirred with heating until the reaction is completed.

6. Process of claim 2, wherein said step [c] is a reaction step wherein the aqueous solution of 3,5-di-tert-butylsalicylic acid obtained in step [a] is added to the aqueous solution of a zinc provider obtained in step [b] while heating the aqueous solution of a zinc provider to cause a reaction between the zinc provider and the 3,5-di-tert-butylsalicylic acid, and the mixture is stirred with heating until the reaction is completed.

7. Process of claim 3, wherein said step [c] is a reaction step wherein the aqueous solution of 3,5-di-tert-butylsalicylic acid obtained in step [a] is added to the aqueous solution of a zinc provider obtained in step [b] while heating the aqueous solution of a zinc provider to cause a reaction between the zinc provider and the 3,5-di-tert-butylsalicylic acid, and the mixture is stirred with heating until the reaction is completed.

8. Process of claim 4, wherein said step [c] is a reaction step wherein the aqueous solution of 3,5-di-tert-butylsalicylic acid obtained in step [a] is added to the aqueous solution of a zinc provider obtained in step [b] while heating the aqueous solution of a zinc provider to cause a reaction between the zinc provider and the 3,5-di-tert-butylsalicylic acid, and the mixture is stirred with heating until the reaction is completed.

9. Process for manufacturing charge control agent whose active ingredient is a crystalline zinc 3,5-di-tert-butylsalicylate represented by General Formula (1) below, and having major peaks of X-ray diffraction using the CuK α-characteristic X-ray at Bragg angles 2θ of at least 5.2±0.2°, 6.7±0.2°, 7.7±0.2° and 15.7±0.2° comprising:

[f] a step for adding an alkaline aqueous solution to a 3,5-di-tert-butylsalicylic acid, which is dissolved with heating, said 3,5-di-tert-butylsalicylic acid being obtained by butylation of salicylic acid;

[g] a step for preparing an aqueous solution of a zinc provider in water;

[h] a reaction step wherein the aqueous solution of 3,5-di-tert-butylsalicylic acid obtained in step [f] is added drop by drop to the aqueous solution of a zinc provider obtained in step [g] while heating the aqueous solution of the zinc provider, and the reaction is carried out with heating and pH adjustment:

(1)

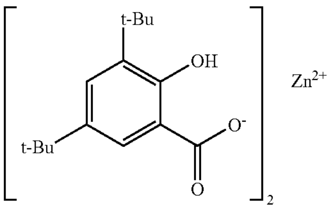

in which t-Bu represents a tert-butyl group.

10. Process of claim 9, further comprising a step of

[i] a step for filtering the reaction mixture obtained in step [h] after completion of the reaction, and washing with water and drying the cake filtered off.

11. Process of claim 9, wherein said zinc provider is a zinc sulfate, a zinc chloride or a zinc acetate.

12. Process of claim 10, wherein said zinc provider is a zinc sulfate, a zinc chloride or a zinc acetate.

13. Process of claim 9, wherein said step [h] is a reaction step wherein the aqueous solution of 3,5-di-tert-butylsalicylic acid obtained in step [f] is added drop by drop to the aqueous solution of a zinc provider obtained in step [g] while heating the aqueous solution of the zinc provider to cause a reaction between the zinc provider and the 3,5-di-tert-butylsalicylic acid, and the reaction is carried out with heating and pH adjustment.

14. Process of claim 10, wherein said step [h] is a reaction step wherein the aqueous solution of 3,5-di-tert-butylsalicylic acid obtained in step [f] is added drop by drop to the aqueous solution of a zinc provider obtained in step [g] while heating the aqueous solution of the zinc provider to cause a reaction between the zinc provider and the 3,5-di-tert-butylsalicylic acid, and the reaction is carried out with heating and pH adjustment.

15. Process of claim 11, wherein said step [h] is a reaction step wherein the aqueous solution of 3,5-di-tert-butylsalicylic acid obtained in step [f] is added drop by drop to the aqueous solution of a zinc provider obtained in step [g] while heating the aqueous solution of the zinc provider to cause a reaction between the zinc provider and the 3,5-di-tert-butylsalicylic acid, and the reaction is carried out with heating and pH adjustment.

16. Process of claim 12, wherein said step [h] is a reaction step wherein the aqueous solution of 3,5-di-tert-butylsalicylic acid obtained in step [f] is added drop by drop to the aqueous solution of a zinc provider obtained in step [g] while heating the aqueous solution of the zinc provider to cause a reaction between the zinc provider and the 3,5-di-tert-butylsalicylic acid, and the reaction is carried out with heating and pH adjustment.

17. Process for manufacturing charge control agent whose active ingredient is a crystalline zinc 3,5-di-tert-butylsalicylate having major peaks of X-ray diffraction using the CuK α-characteristic X-ray at Bragg angles 2θ of at least 5.2±0.2°, 6.7±0.2°, 7.7±0.2° and 15.7±0.2° comprising:

[k] step for dissolving a 3,5-di-tert-butylsalicylic acid, which is obtained by butylation of salicylic acid, in a sodium hydroxide aqueous solution, and heating said solution to about 70° C.;

[l] step for dissolving a zinc sulfate heptahydrate in water; and

[m] step wherein the resultant aqueous solution of 3,5-di-tert-butylsalicylic acid in step [k] is added drop by drop to the aqueous solution of a zinc sulfate obtained in step [l], the reaction is carried out at 70 to 80° C. for 2 hours, and the pH of the reaction mixture is adjusted to 7.0±0.5 to complete the reaction.

18. Process of claim 17, further comprising a step of:

[n] step for filtering the reaction solution obtained in step [m] while the reaction solution remains hot, and the cake filtered off is washed with water and dried.

19. Process of claim 17, wherein said step [m] is a step wherein the resultant aqueous solution of 3,5-di-tert-butylsalicylic acid in step [k] is added drop by drop to the aqueous solution of a zinc sulfate obtained in step [l] to cause a reaction between the zinc sulfate and the 3,5-di-tert-butylsalicylic acid, the reaction is carried out at 70 to 80° C. for 2 hours, and the pH of the reaction mixture is adjusted to 7.0±0.5 to complete the reaction.

20. Process of claim 18, wherein said step [m] is a step wherein the resultant aqueous solution of 3,5-di-tert-butylsalicylic acid in step [k] is added drop by drop to the aqueous solution of a zinc sulfate obtained in step [l] to cause a reaction between the zinc sulfate and the 3,5-di-tert-butylsalicylic acid, the reaction is carried out at 70 to 80° C. for 2 hours, and the pH of the reaction mixture is adjusted to 7.0±0.5 to complete the reaction.

21. Process of claim 17, wherein said crystalline zinc 3,5-di-tert-butylsalicylate is represented by General Formula (1) below:

(1)

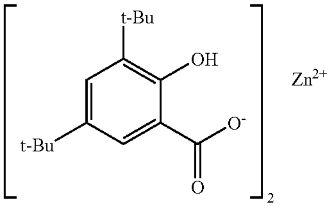

in which t-Bu represents a tert-butyl group.

22. Process of claim 18, wherein said crystalline zinc 3,5-di-tert-butylsalicylate is represented by General Formula (1) below:

(1)

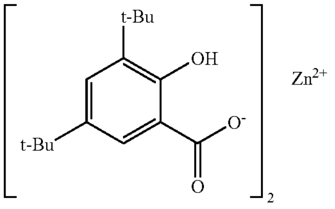

in which t-Bu represents a tert-butyl group.

23. Process of claim 19, wherein said crystalline zinc 3,5-di-tert-butylsalicylate is represented by General Formula (1) below:

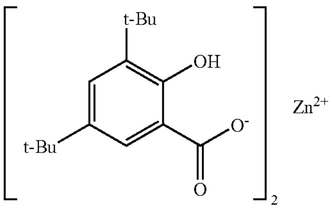
(1)
in which t-Bu represents a tert-butyl group.
24. Process of claim 20, wherein said crystalline zinc 3,5-di-tert-butylsalicylate is represented by General Formula (1) below:
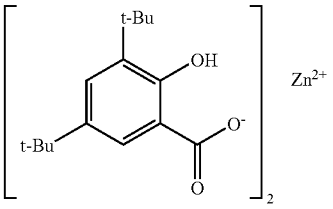
(1)
in which t-Bu represents a tert-butyl group.
* * * * *